United States Patent [19]
Horie

[11] Patent Number: 5,732,050
[45] Date of Patent: Mar. 24, 1998

[54] RECORDING AND REPRODUCING APPARATUS

[75] Inventor: Nobuyuki Horie, Kashihara, Japan

[73] Assignee: Sharp Kabushiki Kaisha, Osaka, Japan

[21] Appl. No.: 556,387

[22] Filed: Nov. 13, 1995

[30] Foreign Application Priority Data

Nov. 10, 1994 [JP] Japan ..................... 6-276754

[51] Int. Cl.$^6$ .................... G11B 17/22; G11B 3/90
[52] U.S. Cl. .................... 369/32; 369/54; 369/58
[58] Field of Search .................... 369/32, 54, 58,
369/47, 48, 275.3, 13; 360/59, 114; 365/122

[56] References Cited

U.S. PATENT DOCUMENTS

| | | | |
|---|---|---|---|
| 4,631,723 | 12/1986 | Rathbun et al. | 360/47 |
| 4,730,290 | 3/1988 | Takasago et al. | 369/32 |
| 4,841,498 | 6/1989 | Sugimura et al. | 369/32 |
| 4,924,331 | 5/1990 | Robinson et al. | 360/72.1 |
| 5,068,842 | 11/1991 | Naito | 369/32 |
| 5,130,969 | 7/1992 | Sako | 369/58 |
| 5,319,627 | 6/1994 | Shinno et al. | 369/32 |
| 5,357,381 | 10/1994 | Yasuda et al. | 360/53 |
| 5,532,992 | 7/1996 | Funamoto | 369/58 |

FOREIGN PATENT DOCUMENTS

| | | |
|---|---|---|
| 4157670 | 5/1992 | Japan . |
| 5258543 | 8/1993 | Japan . |
| 5298857 | 12/1993 | Japan . |

*Primary Examiner*—Tan Dinh
*Attorney, Agent, or Firm*—David G. Conlin; David D. Lowry

[57] ABSTRACT

A recording and reproducing apparatus including a defects-list storing section for storing a defects list of a list area of an optical disk provided with a defective sector alternate function, an alternate sector storing area for storing data of an alternate sector of the optical disk, and a writing and reading controlling section for writing the defects list and the data of the alternate sector indicated by the defects list in the defects-list storing section and the alternate sector storing area when the optical disk is loaded in the main body of the apparatus. Since the data of the defective sector is written in the alternate sector storing area in advance, it is possible to read the data based on the defects list whenever necessary. Consequently, there is no need to scan the alternate sector of the optical disk, thereby reducing a lowering of the data transmission speed.

10 Claims, 8 Drawing Sheets

RECORDING AND REPRODUCING APPARATUS

FIELD OF THE INVENTION

The present invention relates to a recording and reproducing apparatus which performs a defective sector alternate function when a defective sector is detected in a data sector recording area of a disk-shaped recording medium.

BACKGROUND OF THE INVENTION

A conventionally known recording and reproducing apparatus records and reproduces information by scanning a rotating disk as a recording medium, for example, a hard disk and an optical disk, with a pickup. The optical disk has a data sector recording area as a recording format so as to record data based on the information in each sector corresponding to a predetermined data volume.

The recording and reproducing apparatus is provided with an alternate function so that, when a defective sector is detected in the data sector recording area during recording of data, the data is recorded in an alternate sector instead of the defective sector.

More specifically, on the disk, the alternate sector is arranged in advance as an alternate sector recording area on a track whose position is different from a data sector recording area in which a normal data recording sector is arranged. When a defective sector is detected, the data allocated for the defective sector is sequentially allocated for and recorded in an alternate sector in the alternate sector recording area.

In the recording and reproducing apparatus, which sector in the data sector recording area is a defective sector and which alternate sector is used in place of the defective sector are recorded on a defects list of the disk. The defects list is recorded in a list area which is arranged on a track located in a position different from the data sector recording area and the alternate sector recording area of the disk.

In this recording and reproducing apparatus, when a defective sector is detected in the data sector recording area during recording of data in the data recording area, the data to be recorded in the defective sector may be recorded in an alternate sector in the alternate sector recording area.

The following description will discuss an example of the reproduction of such data in the recording and reproducing apparatus. As illustrated in FIG. 8, for example, a data track and an alternate data track are arranged in the data sector recording area and the alternate sector recording area, respectively, on the above-mentioned disk. For instance, four sectors, P, Q, R and S, are arranged as the alternate track.

The following description gives an example in which, when an instruction to transmit information recorded in the five sectors, A, B, C, D and E of one data track in the data sector recording area is input by an external device, such as, a host computer, the information in the third sector (sector C) is recorded in the alternate sector P.

When reproducing the data recorded in the five sectors, first, the pickup is positioned on a data track containing the sector A. Subsequently, the sectors A and B are successively read by the pickup.

Next, the pickup is moved and positioned in an alternate track containing the sector P, and the sector P is read by the pickup. Subsequently, the pickup is moved back to and positioned on the previous data track, and the remaining sectors on the data track, D and E, are read by the pickup.

The data thus read is successively written in a buffer RAM as shown in FIG. 9 in the same order in which the data was read by a reproduction system. Thereafter, the written data is transmitted in this order to the host computer.

In a conventional example, however, as described above, if the sector C is replaced with the sector P on another track, it is necessary to temporarily move the pickup to the alternate track containing the sector P and move back the pickup to the previous track as shown in FIG. 8. Moreover, this conventional example requires a wait time for a disk rotation between the pickup being moved between tracks and positioned and the arrival of the pickup at a target sector.

In the conventional structure, therefore, the processing time required for reading data from each section of the disk becomes much longer than that required in the case in which the sector C is not replaced. As a result, the time taken to complete the reading of data, i.e., the data transmission time from the disk, becomes longer. Accordingly, in the above-mentioned conventional structure, the reproduction of data which requires a severe restriction on the data transmission speed, for example, the reproduction of a moving image, may suffer from such a drawback that the image quality of the moving image is degraded.

SUMMARY OF THE INVENTION

It is an object of the present invention to provide a recording and reproducing apparatus capable of shortening the transmission speed of data from a disk.

In order to achieve the above object, a recording and reproducing apparatus of the present invention includes:

a main body for loading a disk-shaped recording medium therein so that the recording medium is freely installable in and removable from the main body;

recording and reproducing means for recording and reproducing data on the recording medium loaded in the main body;

controlling means for controlling the recording and reproducing means and for performing an alternate function with respect to a defective sector on the recording medium; and storing means for storing data reproduced from the recording medium by the recording and reproducing means, wherein, when the recording medium is loaded in the main body, the controlling means controls the recording and reproducing means to reproduce a defects list for the alternate function from the recording medium and write the defects list in the storing means, and reproduce data of an alternate sector indicated by the defects list from the recording medium and write the reproduced data in the storing means.

In this structure, the defects list and the data of an alternate sector indicated by the defects list are written in advance in the storing means by the controlling means when the recording medium is loaded in the main body. Therefore, if the data of a defective sector is included in the data instructed to be transmitted, the controlling means detects based on the defects list that the defective sector is included in the sectors in the data sector recording area in which the data instructed to be transmitted is recorded.

Thus, in this structure, when reproducing the data from the data sector recording area, the controlling means can read the data of an alternate sector corresponding to the defective sector from the storing means based on the defects list.

It is therefore possible to successively transmit the data instructed to be transmitted by eliminating the necessity of moving the recording and reproducing means from the data sector recording area to the alternate sector recording area or from the alternate sector recording area to the data sector recording area whenever the data corresponding to the defective sector is reproduced.

Accordingly, in this structure, even when a defective sector is detected on the recording medium, it is possible to transmit the data according to the transmission instruction while preventing a considerable lowering of the data transmission speed.

Consequently, this structure can prevent problems including the degradation of the image quality in the reproduction of the data such as a moving image which severely restricts the data transmission speed, and is thus suitable for recording and reproduction of data such as the moving image.

For a fuller understanding of the nature and advantages of the invention, reference should be made to the ensuing detailed description taken in conjunction with the accompanying drawings.

DESCRIPTION OF THE PREFERRED EMBODIMENT

The following description discusses one embodiment of the present invention with reference to FIGS. 1 to 7.

Figure 1:
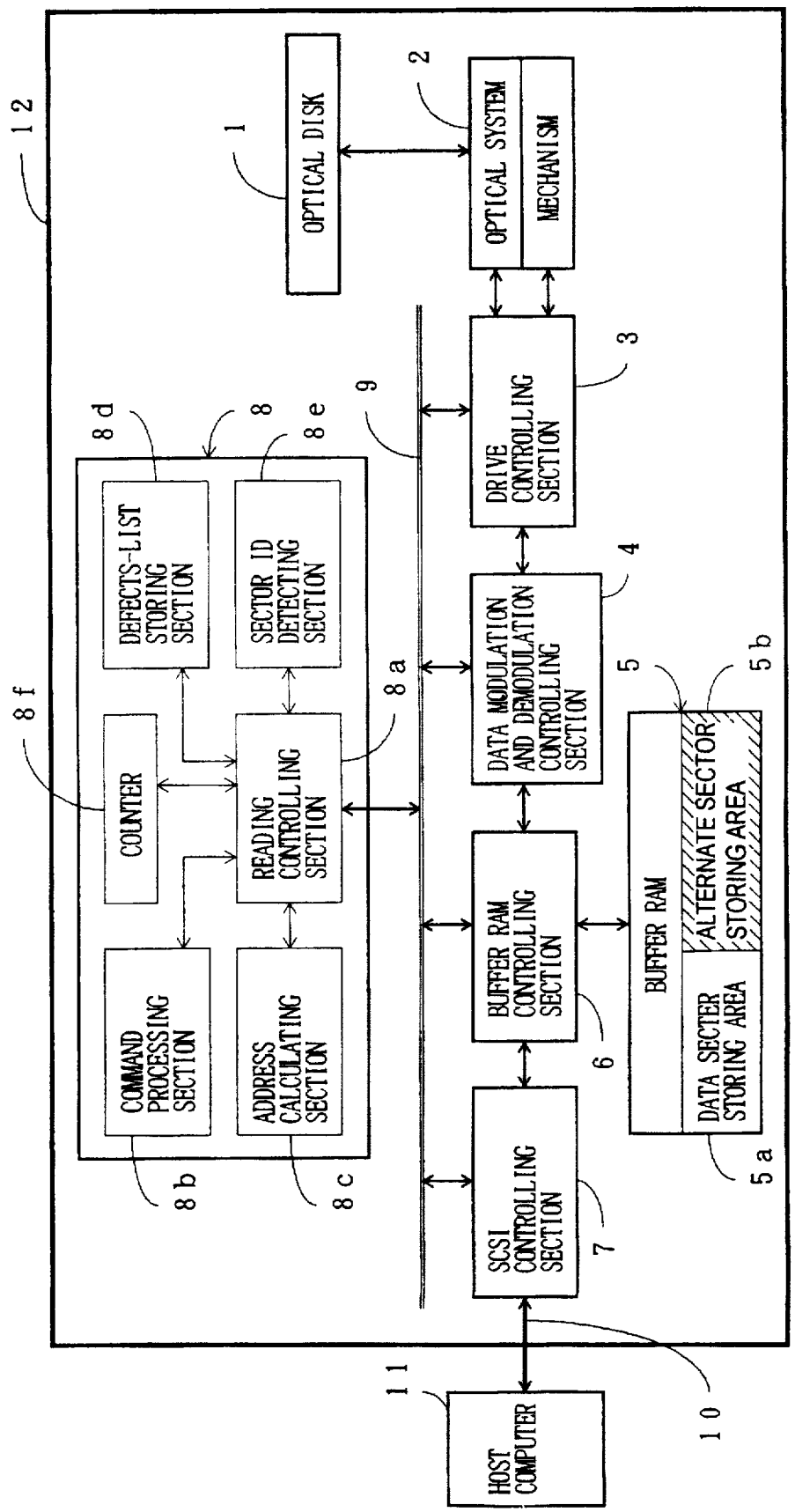
FIG. 1 is a block diagram of essential sections of a recording and reproducing apparatus of the present invention.

As illustrated in FIG. 1, an optical disk drive as a recording and reproducing apparatus includes an optical system and mechanism (recording and reproducing means) 2 for recording and reproducing data corresponding to information on an optical disk 1. The optical system and mechanism 2 rotates the optical disk (recording medium) 1 such as a rewritable magneto-optical disk which permits rewriting data, and records data signals corresponding to the data on a track of the optical disk 1 by scanning the optical disk 1 with the irradiation of, for example, laser light. The optical system and mechanism 2 reads and reproduces the data by scanning the data signals with the irradiation of laser light on the track.

Regarding a method for recording "recording data signals" on the optical disk 1, there is magneto-optical recording, for example, a light intensity modulation method and a magnetic intensity modulation method. In the light intensity modulation method, the data signals are recorded by irradiating laser light whose intensity has been modulated according to the data signals on a portion of the optical disk 1 where an external magnetic field is produced. In the magnetic intensity modulation method, the temperature of a portion of the optical disk 1 is raised by irradiating laser light, an external magnetic field where the magnetic intensity has been modulated according to the data signals is produced in the temperature raised portion, and the data signals are recorded in the temperature raised portion.

With respect to a method for reproducing the recorded data signals from the optical disk 1, for example, there is a method in which the data signals are read from the track in the recorded portion by irradiating the track with the laser light from the optical system and mechanism 2 and using a change in the reflected light, for example, a change in the Kerr rotation angle.

The track is a spiral groove with a track pitch of, for example, 1.6 μm, formed concentrically with the rotation axis of the optical disk 1. The track includes a magneto-optical recording medium such as a perpendicularly magnetized film as a recording layer for recording data signals. The absolute address of the track and the track number which are given to each rotation of the track are arranged to increase outward from the center of the optical disk 1. It is also possible to form the groove in concentric circles.

The absolute address is given so as to enable a detection of a predetermined location on the track, for example, the absolute location of each track with respect to a scanning start point of the innermost track which is to be scanned first, by irradiating the track with the laser light from the optical system and mechanism 2.

The data signals are recorded sector by sector as a recording unit of a predetermined amount of bytes, for example, 1024 B, on the track along the rotating direction of the optical disk 1. Regarding the format of the sector, each sector includes an address section, a flag section, a data section and a buffer which are to be scanned in this order. In the address section, a sector number, a sector ID, a track number and so on are recorded. In the flag section, a signal indicating whether or not a data signal has already been recorded in the data section of the sector is recorded.

Figure 2:
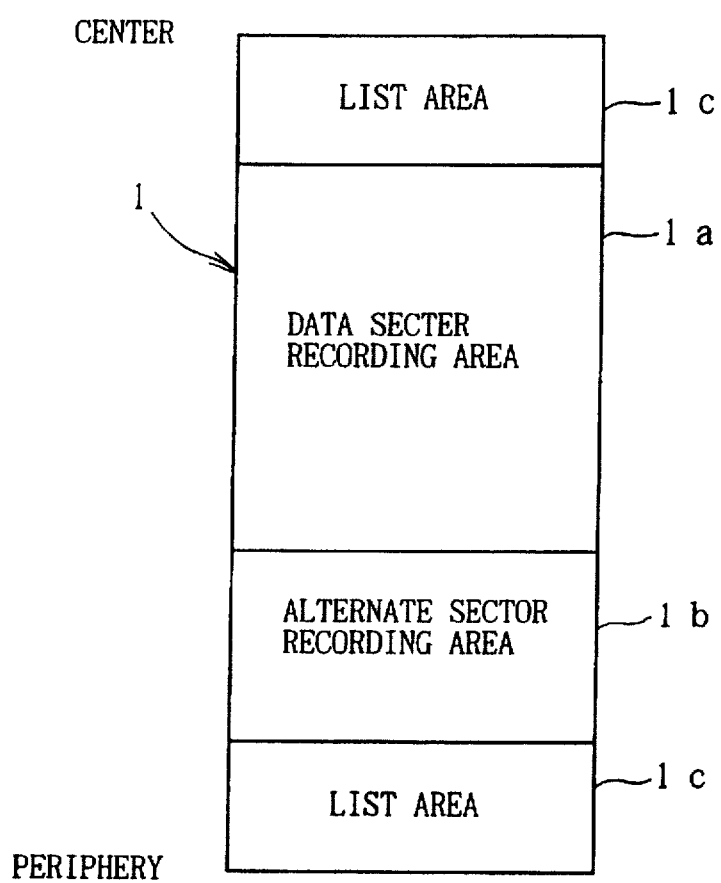
FIG. 2 explains a recording area of an optical disk for use in the recording and reproducing apparatus.

As illustrated in FIG. 2, the optical disk 1 includes a data sector recording area 1a, an alternate sector recording area 1b, and a list area 1c. The data sector recording area 1a includes tracks on which recoding data signals corresponding to data are recorded. The alternate sector recording area 1b includes alternate sectors so that, when a defective sector is detected from the sectors of a track in the data sector recording area 1a, the data signal to be recorded in the defective sector is recorded in an alternate sector. The list area 1c is a recording area in which the absolute address and the sector number of the defective sector, the absolute address and the sector number of the alternate sector corresponding to the defective sector, and the relation between the defective sector and the alternate sector are recorded as a defects list.

The same list areas 1c are arranged in the innermost location and the outermost location of the optical disk 1, respectively. The data sector recording area 1a is arranged outside the innermost list area 1c. The alternate sector recording area 1b is arranged between the data sector recording area 1a and the outermost list area 1c.

As described above, since the list areas 1c are arranged in the outermost and innermost locations, respectively, even if reproducing the innermost list area 1c is unavailable for some reasons, for example, an accident, the outermost list area 1c is reproduced, thereby ensuring the safety and reliability of the defects list representing the information in the list areas 1c.

Moreover, as illustrated in FIG. 1, the recording and reproducing apparatus includes a drive controlling section 3, a data modulation and demodulation controlling section 4, a buffer RAM (random access memory) 5 functioning as memory means, a buffer RAM controlling section 6, an SCSI controlling section 7, and a controlling section (controlling means) 8.

The drive controlling section 3 detects the absolute address based on the data signal from the optical system and mechanism 2, and performs servo control and mechanism control with respect to the optical system and mechanism 2.

The data modulation and demodulation controlling section 4 modulates the input data into data signals in a recording format suitable for recording on the optical disk 1 by, for example, a (2,7) bit position method or a 4/15 differential detection method, and demodulates the data signal reproduced from the optical disk 1 by the optical system and mechanism 2 into data.

The data modulation and demodulation controlling section 4 gives a sector number of the optical disk 1 on which the data is recorded for every a data volume corresponding to a sector of the optical disk 1, and outputs the data.

The buffer RAM 5 is used for temporarily writing data input by an external device or for temporarily writing data when outputting the data to an external device. The buffer RAM 5 includes a data sector storing area 5a and an alternate sector storing area 5b separately.

By proving the buffer RAM 5, it is possible to give correcting signals, such as a Reed-Solomon Long Distance Code and a Reed-Solomon Product Code, and a signal representing a sector number, to the data signal in the data modulation and demodulation controlling section 4. It is thus possible to convert the data signal into the above-mentioned recording format suitable for recording.

The buffer RAM controlling section 6 controls the buffer RAM 5 so that, for example, when reading written data by searching a sector number and when a memory address corresponding to the sector number is input, the written data is read sector by sector based on the memory address.

The SCSI controlling section 7 converts data into an SCSI (small computer system interface) format as an interface used for communicating with a host computer 11 as an external device, and converts an SCSI-format signal from the host computer 11 into data.

The controlling section 8 reproduces data signals from the optical disk 1, and totally controls the controlling sections 3, 4, 6 and 7 so as to produce data from the data signals and transmit the data to the external host computer 11. The controlling section 8 is connected to a common bus line 9 so that the controlling section 8 is connected to the controlling sections 3, 4, 6 and 7.

The SCSI controlling section 7 and the host computer 11 are connected to each other with an SCSI bus line 10. The optical disk 1 is freely installable in and removable from a main body 12 of the apparatus incorporating the above-mentioned respective members.

Such a recording and reproducing apparatus has an alternate function so that, when a defective sector is detected in the data sector recording area 1a of the optical disk 1, a data signal to be recorded in the defective sector is recorded in a sector in the alternate sector recording area 1b of the optical disk 1.

In the alternate function, when the data signal is recorded sector by sector in the data sector recording area 1a, the data signal is reproduced immediately after the recording of the data in the sector, and whether the data signal is correctly reproduced or not is judged. If the data signal is correctly reproduced, it is judged that the sector is normal. On the other hand, if the data signal is not correctly reproduced, the sector is recognized as a defective sector and the data signal is recorded in the alternate sector in the alternate sector recording area 1b.

In the above-mentioned structure of this embodiment, when such an alternate function is performed, the sector number and the absolute address of the defective sector are respectively recorded in the list areas 1c. In addition, the sector number and the absolute address of the alternate sector in which the data signal to be recorded in the defective sector is recorded are respectively recorded in the list areas 1c in relation with the defective sector.

The following three criterion are used as the criterion on which the judgement of a defective sector is based. When a data signal is reproduced from a sector in the data sector recording area 1a immediately after the recording of the data signal therein, if errors in the data signal are not completely corrected, the first criteria is used. The second criteria is used if a data error occurs when the reproduction of the data signal is made slightly instable by slightly shifting the focus of the laser light in the optical system and mechanism 2 or slightly decreasing the power of reproducing laser light. The third criteria is used when the number of detected erroneous words is larger than a set number or when the number of detected RESYNC signals in the data signal is larger than a set number.

The controlling section 8 includes a reading controlling section 8a, a command processing section 8b, an address calculating section 8c, a defects-list storing section (memory means) 8d, a sector ID detecting section 8e, and a counter 8f.

The reading controlling section 8a is a microcomputer which totally controls the above-mentioned controlling sections 3, 4, 6 and 7 so as to read and transmit data from the optical disk 1, and is connected to the common bus line 9.

The command processing section 8b processes a command, for example, a command that instructs transmission from the host computer 11, based on the signal from the reading controlling section 8a. Then, the command processing section 8b converts the logical address of the sector from which the data specified by the command is to be read into an actual sector number on the optical disk 1 using the defects-list storing section 8d, and calculates the total number of the sectors.

The address calculating section 8c calculates the address of a memory in the buffer RAM 5 according to the sector number of data to be read from the buffer RAM 5 based on the defects-list storing section 8d, and outputs the address to the buffer RAM controlling section 6 through the reading controlling section 8a.

The defects-list storing section 8d is a cache memory which stores the defects-list read from the list area 1c of the optical disk 1 by the reading controlling section 8a when the optical disk is loaded in the main body 12, and outputs necessary information on the defects-list to the reading controlling section 8a according to a signal from the reading controlling section 8a.

Moreover, when storing data reproduced from the optical disk 1 temporarily in the buffer RAM 5, the defects-list storing section 8d stores the sector number of the data and a corresponding memory address of the buffer RAM 5.

The sector ID detecting section 8e detects from the data read from the buffer RAM 5 a sector number and a sector ID given to a head section of the data. By providing such a sector ID detecting section 8e, it is possible to recognize the sector number and the sector ID of data to be read next among the data sequentially read sector by sector from the buffer RAM 5. If the next data is written in the alternate sector storing area 5b, the data can be read at higher speeds due to the alternate sector storing area 5b.

The counter 8f counts the data read from the buffer RAM 5 sector by sector, and outputs to the reading controlling section 8a the counted sector number which sequentially increased from an initial value. Thus, the reading controlling section 8a judges whether the counted sector number is equal to the total number of sectors in which the data to be read is recorded, and then judges whether the transmission of the data is completed.

With this structure, in the data reproduced from the optical disk 1 according to the command from the host computer 11 that instructs the data transmission, if the data of the defective sector is not contained in the reproduced data, the data is transmitted to the host computer 11 by the command in the following manner.

The data signals reproduced sector by sector from the optical disk 1 by the optical system and mechanism 2 are input to the drive controlling section 3 and used for the servo control and the mechanism control. The data signals are also input to the data modulation and demodulation controlling section 4, and demodulated into data. The data and the sector number thereof are temporarily written in the data sector storing area 5a of the buffer RAM 5 by the controlling section 8 and the buffer RAM controlling section 6.

Subsequently, the data written in the buffer RAM 5 is sequentially read by the controlling section 8 and the buffer RAM controlling section 6. After deleting controlling signals such as the sector ID and the sector number which are no longer required, the data is input as successive data to the SCSI controlling section 7. The data is converted into the predetermined SCSI format in the SCSI controlling section 7, and transmitted to the host computer 11 through the SCSI bus line 10. This series of controlling operations is executed by the controlling section 8.

Figure 3:
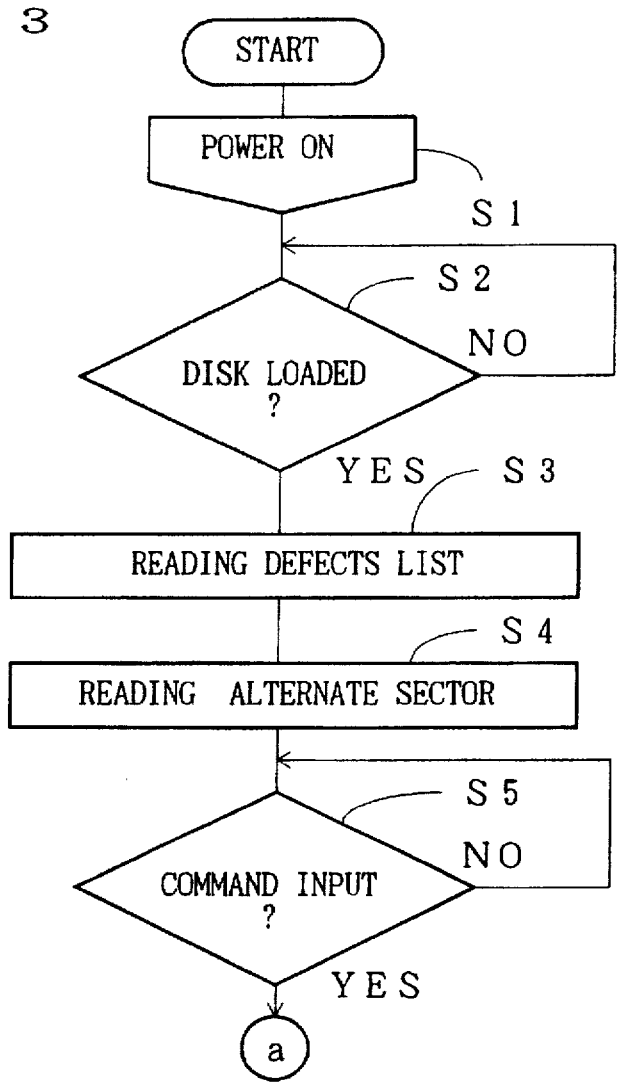
FIG. 3 is a flow chart showing an operation when the optical disk is loaded in the recording and reproducing apparatus.
Figure 4:
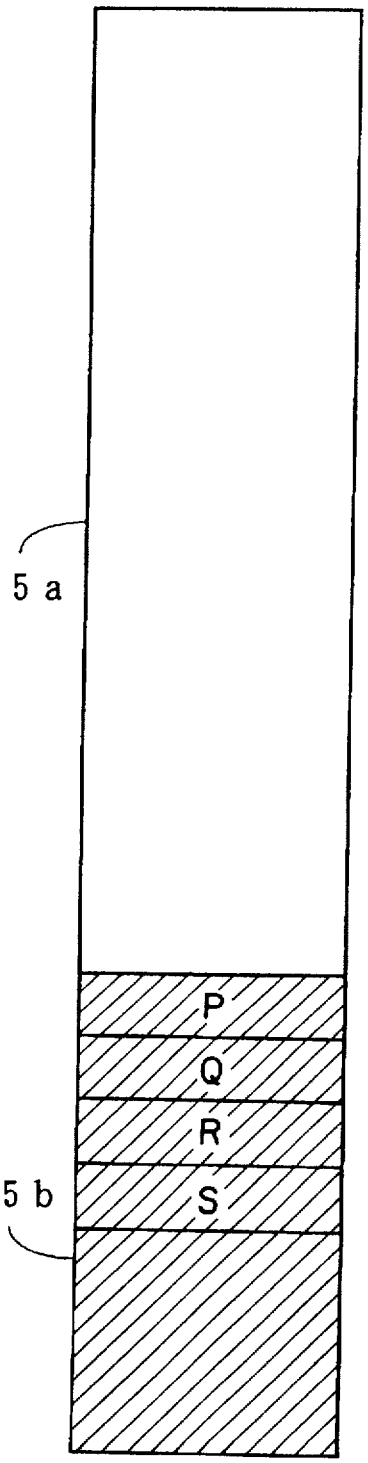
FIG. 4 comprising FIGS. 4(a) and 4(b) explains a written state of data in a buffer RAM of the recording and reproducing apparatus, wherein FIG. 4(a) explains a written state of data after the optical disk is loaded, and FIG. 4(b) explains a written state of data after an instruction to transmit the data is input.
Figure 4:
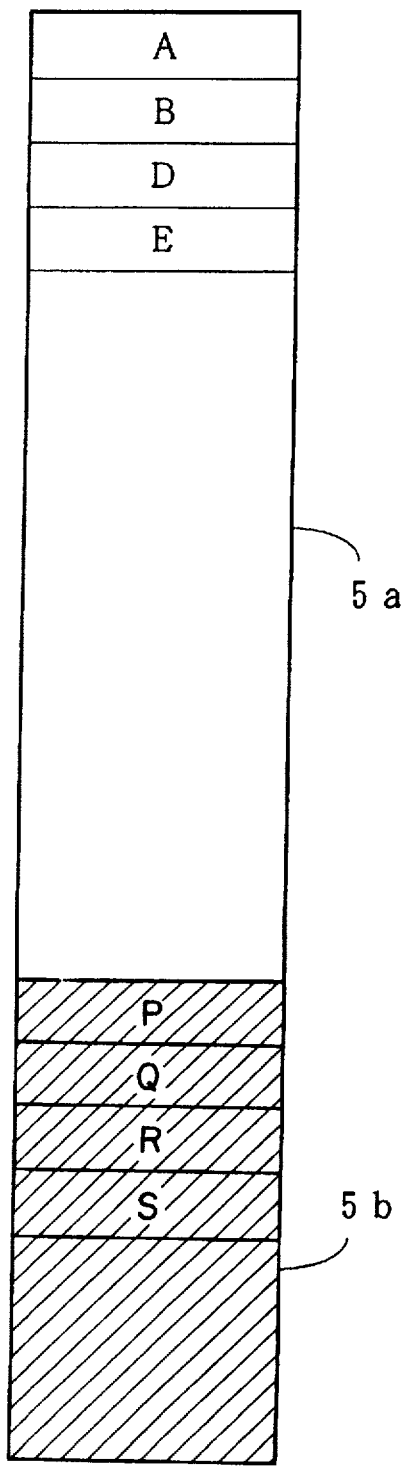

With this structure, in the event where a defective sector is detected from the data sector recording area 1a of the optical disk 1, the data signal to be recorded in the defective sector is recorded in the alternate sector and the list indicating the defective sector, and the alternate sector is recorded in the list area 1c, when the optical disk 1 is loaded in the main body 12, the controlling section 8 performs the following operation as shown in FIG. 3.

When the power supply is turned on (Step 1, hereinafter Step is just indicated as S), whether the optical disk 1 has been loaded in the main body 12 is judged based on the presence of a servo controlling signal from the optical system and mechanism 2 (S2). When the servo controlling signal is not present, the controlling section 8 returns to S2, and goes into the standby state. On the other hand, when it is judged that the optical disk 1 has been loaded, the optical disk 1 is rotated, the list area 1c of the optical disk 1 is scanned by the optical system and mechanism 2, and the defects list is reproduced from the list area 1c and written in the defects-list storing section 8d (S3).

Subsequently, the alternate sector in the alternate sector recording area 1b is scanned and reproduced by the optical system and mechanism 2 according to the defects list, and data which has been demodulated from the signal of the alternate sector is written in the buffer RAM 5.

More specifically, as shown in FIG. 4(a), according to the defects list, for example, data of the sectors P, Q, R and S are written in the alternate sector storing area 5b of the buffer RAM 5. Although it is not shown in FIG. 4(a), the relation between the sector numbers of the defective sectors and the sectors P, Q, R and S corresponding to the defective sectors are written in the defects-list storing section 8d (S4).

When the reading of the alternate sector in S4 is complete, it is judged that whether a command instructing the transmission of the data on the optical disk 1 has been input from the host computer 11 (S5) as shown in FIG. 3. If the command has not been input, the controlling section 8 returns to S5 and goes into the standby state. On the other hand, if the command is input, the controlling section 8 moves to the next step.

Next, in the case where the data of the defective sector was written in the alternate sector storing area 5b of the buffer RAM 5 in advance when the optical disk 1 was loaded, for example, if a command instructing the reading and transmission of data corresponding to five sectors in the data sector recording area 1a of the optical disk 1 is input from the host computer 11 and if the third sector among the five sectors is a defective sector, the following operations are performed. In this case, it is assumed that the data of the third sector is written, for example, in the sector P in the alternate sector storing area 5b of the buffer RAM 5.

Figure 5:
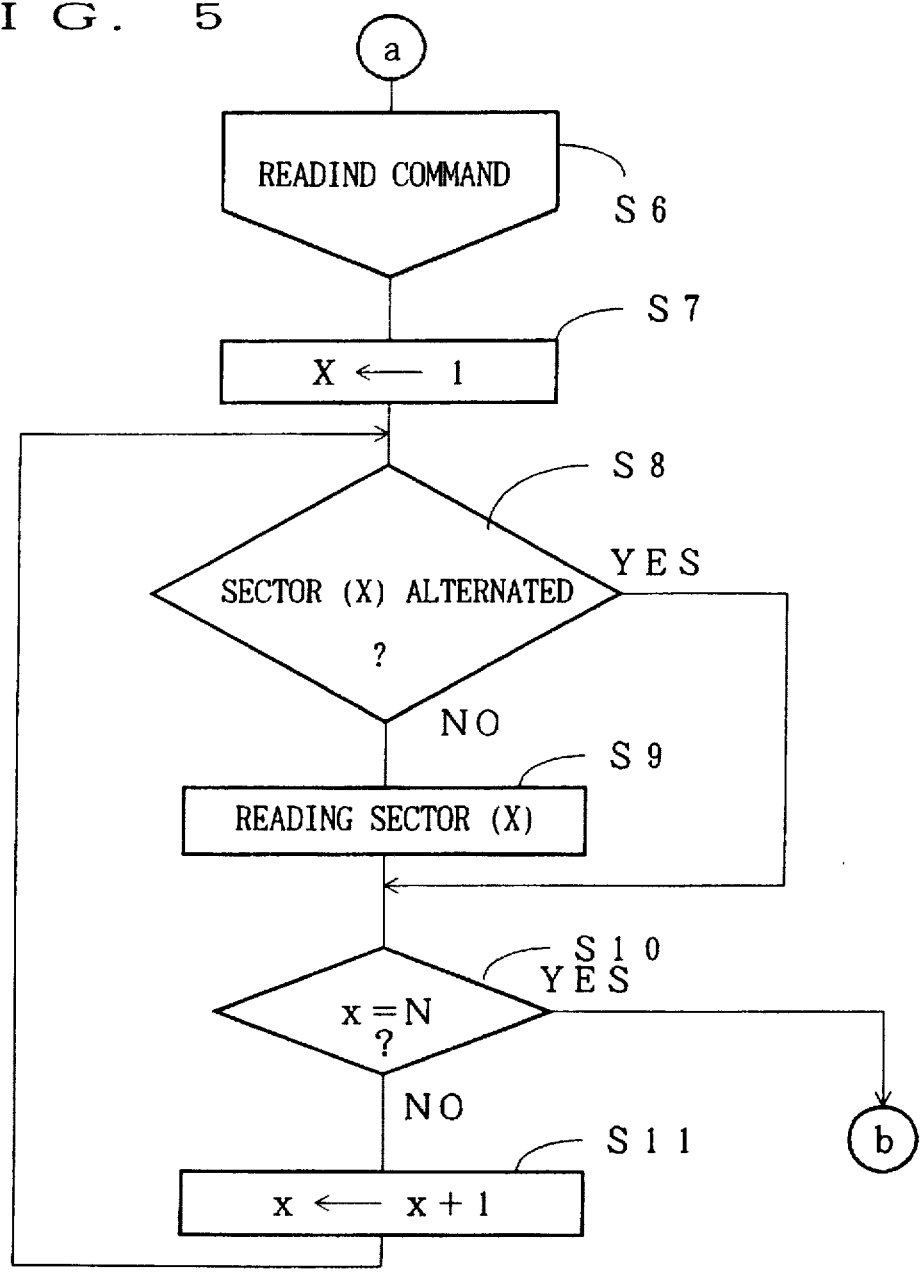
FIG. 5 is a flow chart showing a reading operation of data from the optical disk in the recording and reproducing apparatus when the instruction to transmit the data is input.
Figure 6:
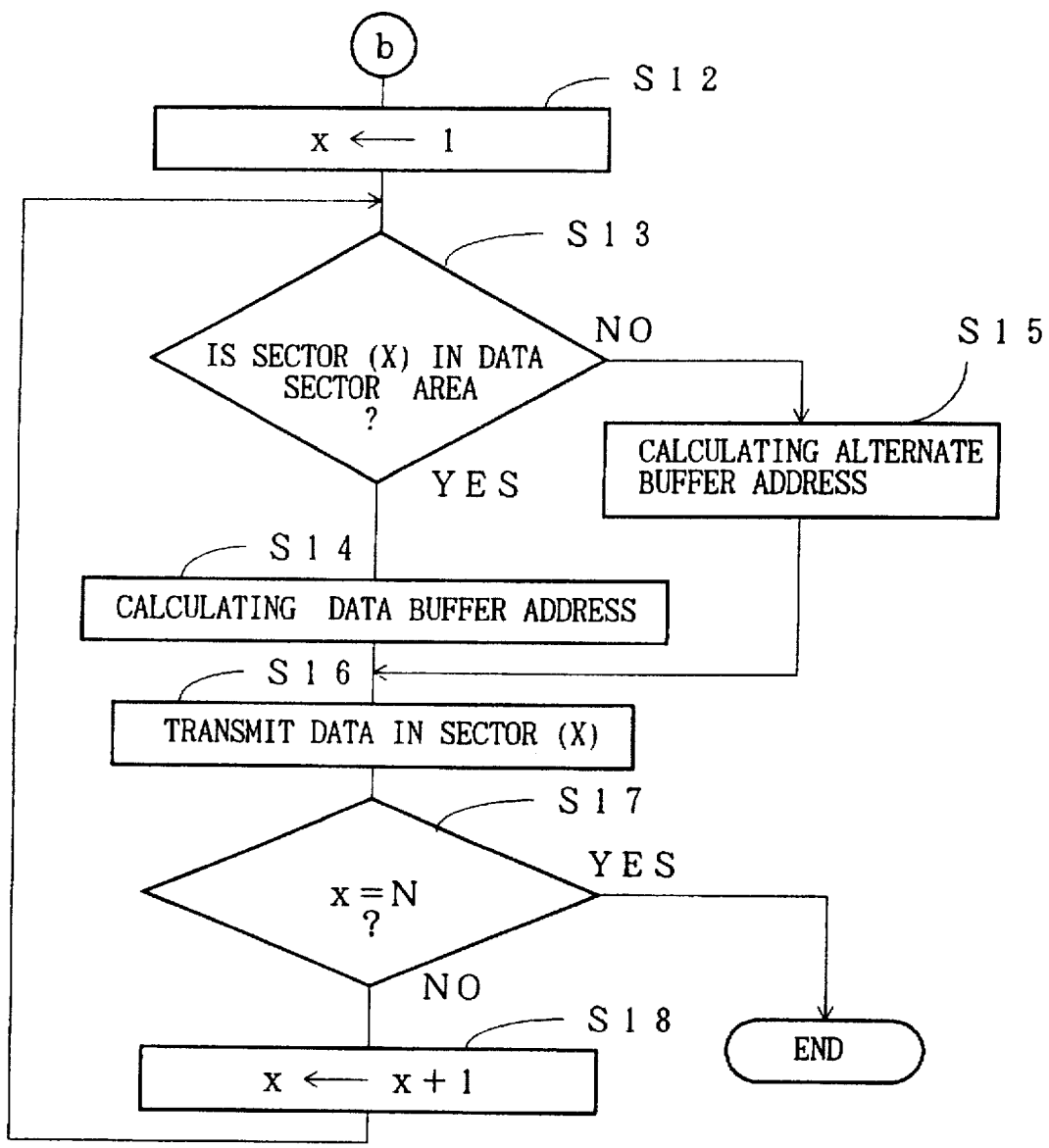
FIG. 6 is a flow chart showing an operation for transmitting data from the optical disk in the recording and reproducing apparatus when the instruction to transmit the data is input.

In order to simplify the explanation of the respective operations, the explanation will be made separately with reference to two flow charts shown in FIGS. 5 and 6. FIG. 5 is a flow chart showing the reading operation on the optical disk 1, i.e., the operation for storing reproduced data in the buffer RAM 5. FIG. 6 is a flow chart showing the reading operation in the host computer 11, i.e., the operation for transmitting the data in the buffer RAM 5 to the host computer 11.

For example, when a command that instructs the reading of data of predetermined five sectors of the optical disk 1 is input from the host computer 11, as shown in FIG. 5, the total number of sectors on the counter 8f which is indicated as a value N in the flow chart is set to five (S6) by reading the command in the command processing section 8b of the controlling section 8.

Subsequently, in the controlling section 8, a variable X on the counter 8f is initialized, for example, is set to 1 (S7). Thereafter, whether the sector (X) on the optical disk 1 is alternated or not is judged by making a comparison with the sector number on the defects list stored in the defects-list storing section 8d (S8).

When the sector (X) is not alternated, the data of the sector (X) is reproduced from the optical disk 1 and stored in the buffer RAM 5 (S9). On the other hand, when the sector (X) is alternated, the reproduction of the sector (X) from the optical disk 1 is stopped, i.e., skipped, and the operation moves to the next step.

Then, it is judged whether the value of X is equal to the value of N, i.e., whether the reproduction of data corresponding to the specified number of sectors has been completed (S10). If the values are not equal, it is judged that the reproduction of the data has not been completed, the variable X on the counter 8f is increased (S11), and the operation moves to S8. When the values are equal, it is judged that the reproduction has been completed, and the operation moves to the next step.

As described above, among the data which was instructed to be transmitted by the command from the host computer 11, data corresponding to the four sectors other than the defective sector is sequentially reproduced, and written in the data sector storing area 5a. The written state of the data in the data sector storing area 5a is shown in FIG. 4(b). Specifically, the data in the sectors A, B, D and E on the optical disk 1 is sequentially reproduced and written in the data sector storing area 5a of the buffer RAM 5.

With the use of the buffer RAM 5, since the data sector storing area 5a and the alternate sector storing area 5b are separately provided and arranged by the address management, there is no need to provide a new buffer RAM.

Referring now to FIG. 6, the following description will discuss the operations for transmitting to the host computer 11 data written in each of the sectors in the data sector storing area 5a and the alternate sector storing area 5b of the buffer RAM 5. The value of N in FIG. 6 is an arbitrary integral and set to five, for example, in this embodiment in the same manner as mentioned above.

First, the variable X on the counter 8f is initialized, for example, is set to one (S12). Thereafter, whether or not the sector (X) is written in the data sector storing area 5a of the buffer RAM 5 or not is determined by making a comparison with the defects list stored in the defects-list storing section 8d (S13).

When the sector (X) is written in the data sector storing area 5a, the memory address in the data sector storing area 5a corresponding to the sector (X) is calculated based on the defects list in the defects-list storing section 8d (S14).

If the sector (X) is not written in the data sector storing area 5a, the data of the sector (X) is written in the alternate sector storing area 5b of the buffer RAM 5. Therefore, the memory address in the alternate sector storing area 5b corresponding to the data of the sector (X) is calculated based on the defects list in the defects-list storing section 8d (S15).

Subsequently, the data in each sector is sequentially read from the data sector storing area 5a and the alternate sector storing area 5b according to the addresses calculated successively in S14 and S15. After deleting unnecessary controlling signals in the buffer RAM controlling section 6, the data is transmitted to the host computer 11 through the SCSI controlling section 7 (S16).

Then, it is judged whether the variable X is equal to the value of N (S17). If the values are not equal, the variable X is increased (S18), the operation moves to S13, and the operations of S13 to S17 are repeated. When the values are equal to each other, the transmission of the data is completed.

Figure 7:
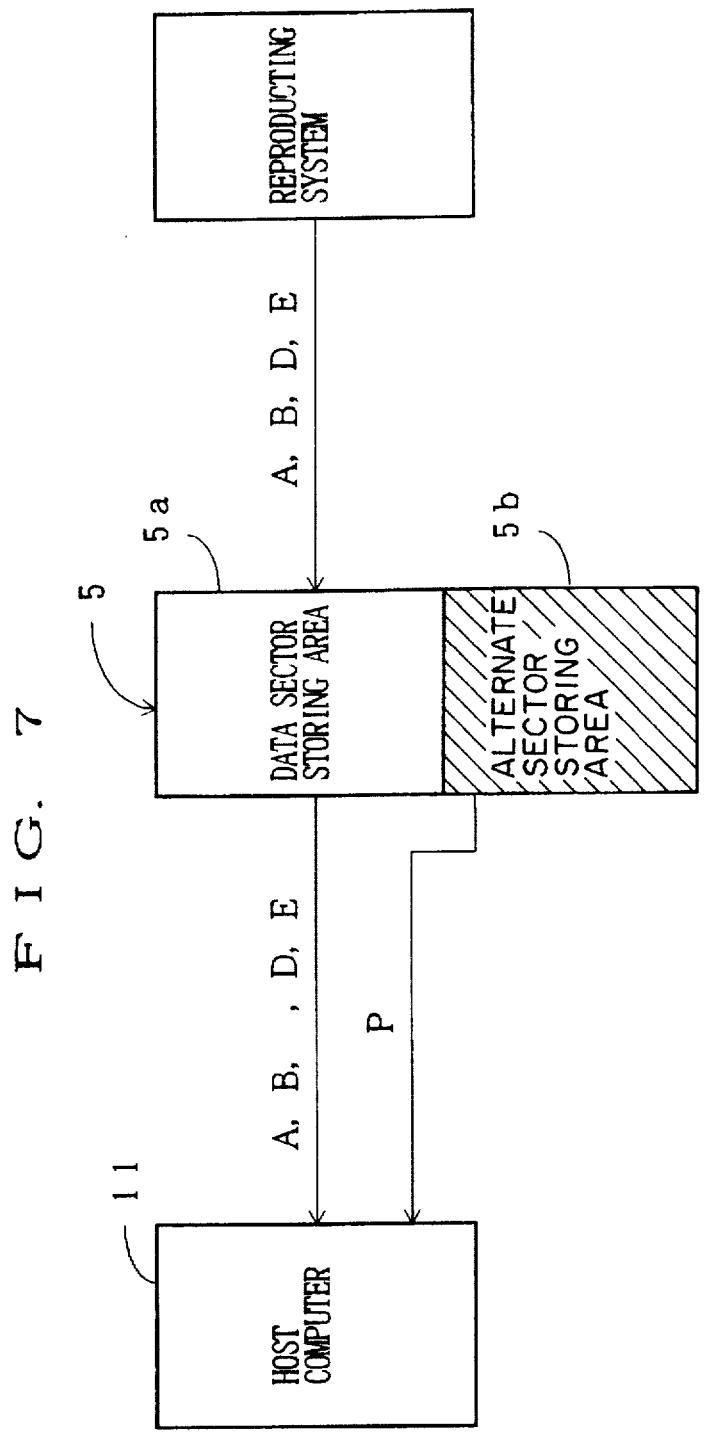
FIG. 7 explains the transmission of data in the recording and reproducing apparatus.
Figure 8:
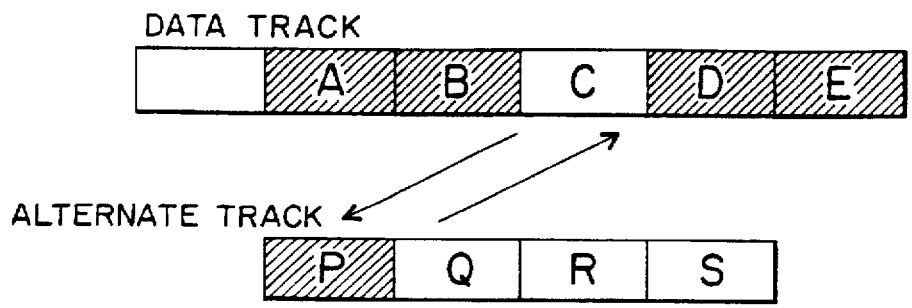
FIG. 8 explains the transmission of data from an optical disk in a conventional recording and reproducing apparatus.
Figure 9:
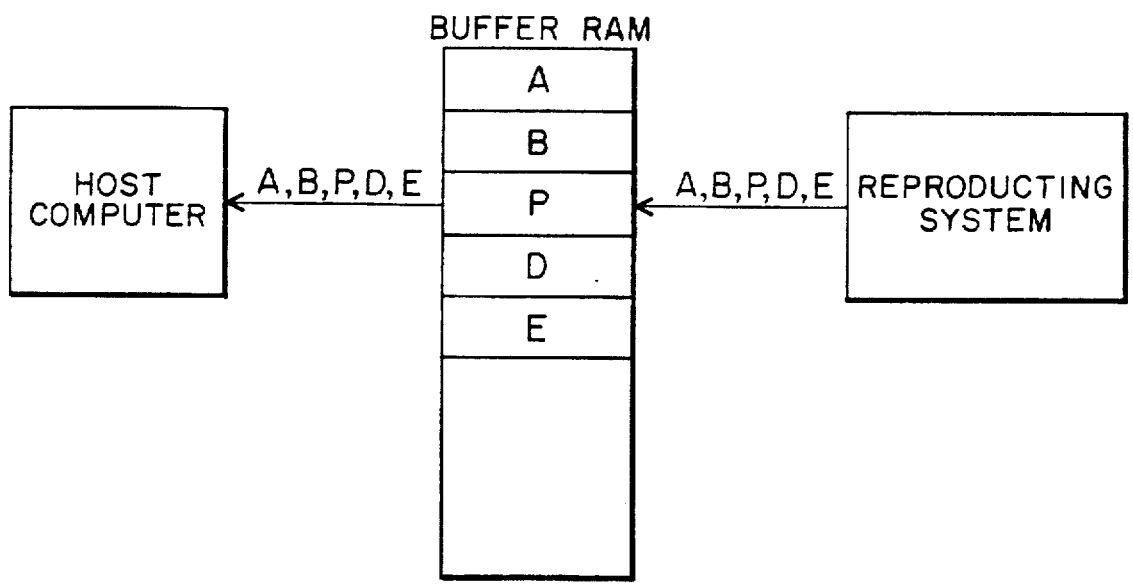
FIG. 9 explains the transmission of data in the recording and reproducing apparatus.

In such a data transmitting operation, as shown in FIG. 4(b) and 7, the data in the sectors A, B, D and E is written in the data sector storing area 5a, while the data in the sector C is written in advance as the sector P in the alternate sector storing area 5b by the reproduction system.

On the other hand, the data in the sectors A and B is transmitted from the data sector storing area 5a of the buffer RAM 5 by the host computer 11. Next, the data in the sector P corresponding to the data in the sector C between the sectors B and D is transmitted from the alternate sector storing area 5b of the buffer RAM 5. Subsequently, the data in the sectors D and E is transmitted from the data sector storing area 5a of the buffer RAM 5.

In a conventional apparatus, the data is reproduced by physically moving the pickup to the data sector recording area and the alternate sector recording area on the optical disk 1 to perform scanning. This structure requires a time-consuming work for reading data from the optical disk 1 whereupon a defective sector is detected.

Therefore, if there is no margin for the delay of the reproduced data, i.e., if there is such a severe restriction on the data transmitting speed as in the reproduction of moving image data on a compact disk for moving images or a laser disk, for example, the image quality of the moving image sometimes degrades due to the presence of the defective sector.

However, in the structure of this embodiment, since the data in the defective sector of the optical disk 1 is written in the alternate sector storing area 5b in advance when the optical disk 1 is loaded, even if a defective sector is detected on the optical disk 1, it is possible to transmit data to an external device at a speed similar to the case where the defective sector is not present. It is thus possible to prevent a delay in the transmission of the data, and, for example, the degradation of the image quality of moving image during the reproduction of the moving image from the compact disk or the laser disk.

Moreover, in the structure of this embodiment, by separately managing the storing areas in the buffer RAM 5, the data sector storing area 5a and the alternate sector storing area 5b are arranged without newly adding a buffer RAM 5. It is therefore possible to restrict the main body 12 of the apparatus from becoming larger in size and complicated while preventing a delay in the transmission of data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording and reproducing apparatus comprising:

a main body for loading a disk-shaped recording medium therein so that said recording medium is freely installable in and removable from said main body;

recording and reproducing means for recording and reproducing data on said recording medium loaded in said main body;

controlling means for controlling said recording and reproducing means and for performing an alternate function with respect to a defective sector on said recording medium; and a random access memory having a data sector storing area and an alternate sector storing area, the data sector storing area for temporarily storing data of each sector reproduced from said recording medium by said recording and reproducing means, the alternate sector storing area for beforehand storing data of an alternate sector, wherein:

when said recording medium is loaded in said main body, said controlling means controls said recording and reproducing means to reproduce a defects list used for the alternate function from said recording medium and writes the defects list in said memory, and reproduces data of an alternate sector indicated by said defects list from said recording medium and writes the reproduced data in the alternate sector storing area; and based on the defects list, said controlling means switches access to the data sector storing area and access to the alternate sector storing area so as to read and output each of data.

2. The recording and reproducing apparatus as set forth in claim 1, wherein said recording medium includes a data sector recording area comprising data sectors in which said data is recorded respectively, an alternate sector recording area in which, when a defective sector is detected from said data sectors, the data to be recorded in said defective sector is alternately recorded, and a list area for recording the defects list indicating said defective sector and an alternate sector corresponding to said defective sector.

3. The recording and reproducing apparatus as set forth in claim 2, wherein said random access memory includes:

a defects-list storing section for storing the defects list of said list area.

4. The recording and reproducing apparatus as set forth in claim 3, wherein said data sector storing area and said alternate sector storing area are arranged in one memory.

5. The recording and reproducing apparatus as set forth in claim 3, wherein said controlling means controls said recording and reproducing means, said data sector storing area, said defects-list storing section and said alternate sector storing area so that the data in said data sector recording area of said recording medium is reproduced from said recording medium and written in said data sector storing area by said recording and reproducing means based on an instruction to transmit the data on said recording medium, and that the data is sequentially read and transmitted from said data sector storing area.

6. The recording and reproducing apparatus as set forth in claim 5, wherein said controlling means judges whether data of a defective sector is included in the data instructed to be transmitted based on the defects list, and when the data of the defective sector is included, said controlling means reads and transmits data of an alternate sector in which the data of said defective sector is recorded from said alternate sector recording area.

7. The recording and reproducing apparatus as set forth in claim 6, wherein said controlling means writes the data of the data sector recording area and a sector number of the data in said data sector storing area, and stores a sector number of the alternate sector corresponding to the defective sector in said defects-list storing section.

8. The recording and reproducing apparatus as set forth in claim 7, wherein said controlling means sequentially reads the data from said data sector storing area according to a transmission instruction, and when the data of the defective sector is included in the read data, said controlling means reads and transmits the data corresponding to the alternate sector from the alternate sector area instead of said defective sector based on the sector number of said defective sector and the sector number of said alternate sector corresponding to the defective sector.

9. The recording and reproducing apparatus as set forth in claim 1, wherein said recording and reproducing means performs scanning by rotating said recording medium when recording and reproducing data from said recording medium, and said controlling means controls said recording and reproducing means to move in a radius direction of said recording medium when scanning said recording medium with said recording and reproducing means.

10. A defects processing method for a disk device, comprising the steps of:

when a disk-shaped recording medium is loaded in the disk device, reproducing a defects list from the recording medium with a recording and reproducing means so that the defects list is used for the alternate function, writing the defects list into a random access memory, reproducing data of an alternate sector indicated by the defects list from the recording medium with the use of the recording and reproducing means, and writing the data in an alternate sector storing area of the memory;

temporarily storing data of each sector reproduced from the recording medium by the recording and reproducing means, in a data sector storing area of the memory, based on the defects list; and switching access to the data sector storing area and access to the alternate sector storing area so as to sequentially read and output each of data in a sector order, based on the defects list.

* * * * *